US012248099B2

(12) United States Patent
Beuschel

(10) Patent No.: US 12,248,099 B2
(45) Date of Patent: Mar. 11, 2025

(54) DEVICE FOR OPERATING A LIGHT SOURCE FOR THE OPTICAL TIME-OF-FLIGHT MEASUREMENT

(71) Applicant: Microvision, Inc., Redmond, WA (US)

(72) Inventor: Ralf Beuschel, Wangen (DE)

(73) Assignee: Microvision, Inc., Redmond, WA (US)

(*) Notice: Subject to any disclaimer, the term of this patent is extended or adjusted under 35 U.S.C. 154(b) by 934 days.

(21) Appl. No.: 17/415,533

(22) PCT Filed: Dec. 16, 2019

(86) PCT No.: PCT/EP2019/085302
§ 371 (c)(1),
(2) Date: Jun. 17, 2021

(87) PCT Pub. No.: WO2020/127013
PCT Pub. Date: Jun. 25, 2020

(65) Prior Publication Data
US 2022/0057493 A1 Feb. 24, 2022

(30) Foreign Application Priority Data
Dec. 18, 2018 (DE) .................. 10 2018 222 049.2

(51) Int. Cl.
G01S 7/48 (2006.01)
G01S 7/4861 (2020.01)
G01S 7/4865 (2020.01)
G01S 17/10 (2020.01)
G01S 17/894 (2020.01)

(52) U.S. Cl.
CPC .......... *G01S 7/4865* (2013.01); *G01S 7/4861* (2013.01); *G01S 17/10* (2013.01); *G01S 17/894* (2020.01)

(58) Field of Classification Search
None
See application file for complete search history.

(56) References Cited

U.S. PATENT DOCUMENTS

| 6,836,317 | B1 | 12/2004 | Perger |
| 8,497,478 | B2 | 7/2013 | Madhani et al. |
| 2005/0201435 | A1 | 9/2005 | Kawai et al. |
| 2019/0124748 | A1* | 4/2019 | Dielacher ............... G01J 1/44 |

FOREIGN PATENT DOCUMENTS

| DE | 40 02 356 C1 | 2/1991 |
| DE | 4423264 | 1/1996 |
| DE | 102 56 429 A1 | 6/2004 |
| JP | H08170987 | 12/1994 |

(Continued)

OTHER PUBLICATIONS

"Office Action for Israel Application 284058".
(Continued)

*Primary Examiner* — Hovhannes Baghdasaryan
(74) *Attorney, Agent, or Firm* — Kevin D. Wills

(57) ABSTRACT

The invention relates to a device for operating a light source for the optical time-of-flight measurement. The light source operating device includes a light source, which is configured to emit light pulses according to a pulse signal sequence and a monitoring circuit for monitoring a light output emitted by the light source based on a current signal and/or voltage signal of the light source.

20 Claims, 1 Drawing Sheet

(56) References Cited

FOREIGN PATENT DOCUMENTS

Figure 1:
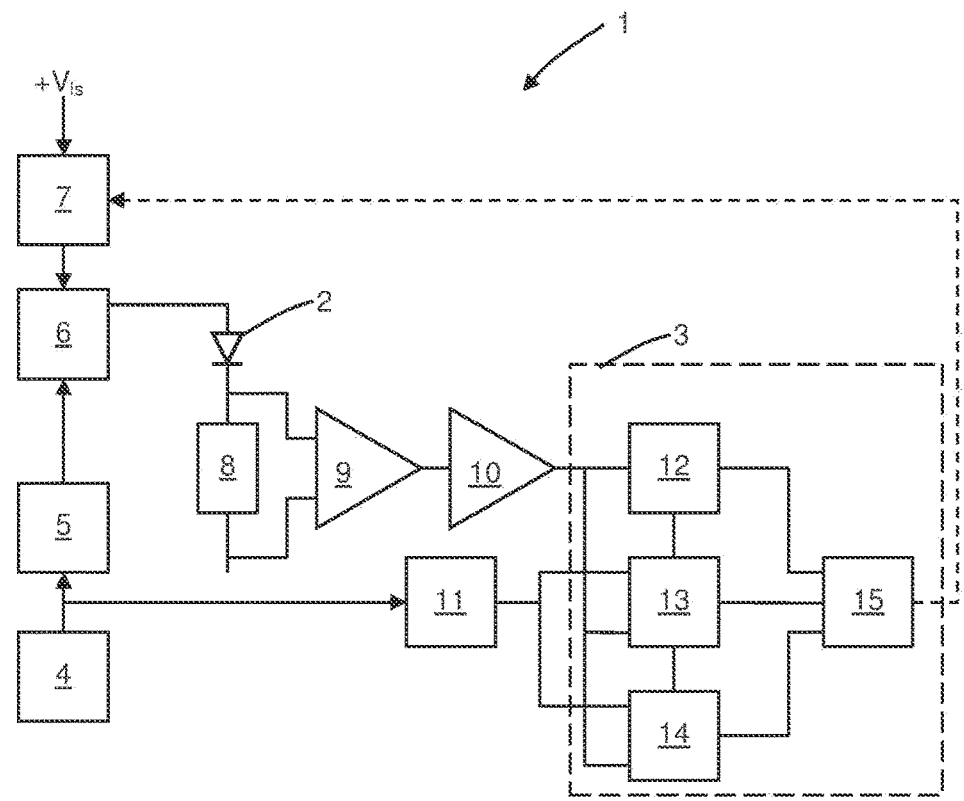

| JP | 08170987 | 2/1996 |
|---|---|---|
| JP | H08-170987 A | 7/1996 |
| JP | 2016-048211 A | 4/2016 |
| WO | 2018050897 A1 | 3/2018 |
| WO | WO2018050897 | 3/2018 |

OTHER PUBLICATIONS

"Search Report for Israel Application 284058".
German search report for the application No. 10 2018 222 049.2 dated Nov. 6, 2019.
Eli Abramov et al. "Low Voltage Sub-Nanosecond Pulsed Current Driver IC for High-Resolution LIDAR Applications" 2018 IEEE Applied Power Electronics Conference and Exposition (APEC), Mar. 4-8, 2018, San Antonio, TX, USA, Seiten 708-715.

* cited by examiner

DEVICE FOR OPERATING A LIGHT SOURCE FOR THE OPTICAL TIME-OF-FLIGHT MEASUREMENT

The present invention generally relates to a device for operating a light source for the optical time-of-flight measurement.

Various methods for the optical time-of-flight measurement are well known, which can be based on the so-called time-of-flight principle, in the case of which the time-of-flight of a light signal, which is emitted and reflected by an object, is measured in order to determine the distance to the object on the basis of the time-of-flight.

Sensors, which are based on the so-called LIDAR principle (light detection and ranging) are used in particular in the motor vehicle field, in the case of which pulses are periodically emitted for scanning the surrounding area, and the reflected pulses are detected. A corresponding method and a device are known, for example, from WO 2017/081294.

U.S. Pat. No. 8,497,478 B2 describes a high voltage supply circuit for controlling a light source in an optical sensor system.

WO 2018/050897 A1 describes an electronic circuit for a time-of-flight sensor.

US 2005/0201435 A1 discloses an object detecting unit.

Even if solutions for the optical distance measurement are known from the prior art, it is an object of the present invention to provide a device for operating a light source for the optical time-of-flight measurement.

The device according to claim 1 solves this object.

According to a first aspect, the present invention provides a device for operating a light source for the optical time-of-flight measurement, comprising:

a light source, which is configured to emit light pulses according to a pulse signal frequency; and a monitoring circuit for monitoring a light output emitted by the light source based on a current signal and/or voltage signal of the light source.

As mentioned, some exemplary embodiments relate to a device for operating a light source for the optical time-of-flight measurement, comprising:

a light source, which is configured to emit light pulses according to a pulse signal frequency; and a monitoring circuit for monitoring a light output emitted by the light source based on a current signal and/or voltage signal of the light source.

The device can generally be used in a LIDAR system or the like and can be used, for example, in the motor vehicle field, without the present invention being limited to these cases. In the case of some exemplary embodiments, the device therefore also comprises a corresponding detector or sensor, for example based on the SPAD (single avalanche photo diode) technology, CPAD (current assisted photo diode) technology, CMOS (complementary metal oxide semiconductor) technology, or the like, for detecting light pulses, which are emitted by the light source and which are reflected by an object. The device can therefore further be configured to determine the time-of-flight of the emitted light pulses and, based thereon, to determine, for example, the distance between the device and the object, a three-dimensional image of the object or the like.

The light source can comprise one or several laser elements, for example laser diodes, VCSEL (vertical surface emitting laser) or the like, or can also be based on LED (light emitting diode) technology or the like.

In the case of some exemplary embodiments, the light source is to be safe for the eyes ("eye safe"), as it may also be required for some light sources, in particular lasers. The eye safety may require, for example, that the emitted average output must not exceed certain values in the case of different time scales, such as a millisecond, or ten seconds, or the like.

According to the invention, the monitoring circuit monitors the light output emitted by the light source, wherein the light source is, for example, deactivated or is not activated in the first place in the case of some exemplary embodiments, when the emitted light output exceeds a threshold value, in the case of which, for example, the eye safety is no longer ensured.

Due to the fact that the light source emits light pulses, it is required in the case of some exemplary embodiments to integrate or to add up the emitted light energy, respectively, in order to monitor the emitted light output.

In the case of some exemplary embodiments, it is therefore required to not only monitor the on-time of the light source, but (also) the current or the voltage, respectively, which the light sources requires in order to be operated.

In the case of some exemplary embodiments, the current pulses, with which the light source is operated based on the pulse sequence (e.g. a laser diode), have a length in a range of from 2 to 10 nanoseconds, without limiting the present invention thereto. It was therefore also recognized that a conventional analog-to-digital converter or transducer would be required in a range of from 1 GHz to 5 GHz, in order to digitize the current signal, whereby such converters are typically expensive and require a high output (e.g. greater than 500 Milliwatts, thus 0.5 Watt), so that other means are used in the case of some exemplary embodiments, as will also be described further below.

In the case of some exemplary embodiments, the determination of the distance is based on the so-called TCSPC (time correlated single photon counting) measuring principle, in particular in the case of exemplary embodiments, which are based on LIDAR.

In the case of some exemplary embodiments, the light source can periodically emit light pulses, for example in the case of a high frequency of every two microseconds in a 300 meter range, without limiting the present invention to this specific example.

The device can comprise a (start) pulse generator for generating a pulse signal, wherein the pulse signal can serve as start pulse for the measurements and also as basis for the generation of the pulse signal sequence.

As mentioned, light pulses can have a length of five to twenty nanoseconds for the measurement, and in some exemplary embodiments, the pulse sequence represents a bit sequence, e.g. a 16 bit pseudo-random bit sequence, so that, for example, a pulse sequence with a length of five nanoseconds represents 16 bits, wherein, for example, each bit with the value "1" means that the light source is active, and "0" means that the light source is inactive (or vice versa).

In the case of some exemplary embodiments, the monitoring circuit comprises an on-time monitor, which is configured to monitor whether the continuous switch-on time of the light source is less than a specified switch-on time threshold value. For this purpose, the on-time monitor can analyze, for example, a voltage signal of the light source, which has a certain value when the light source is active, and which has no or a lower value when the light source is not active. The switch-on time can be proportional to the emitted light energy or light output, respectively.

In the case of some exemplary embodiments, the monitoring circuit comprises a duty factor monitor, which is configured to monitor whether a duty factor of the light pulses (e.g. based on the pulse signal and the current/voltage signal) is smaller than a specified duty factor threshold value. By means of the current/voltage signal, the duty factor monitor can integrate, for example, a pulse train of light pulses, which is created based on the pulse sequence, such that all active light pulses of the pulse train are taken into account. This can take place in that all bits of the pulse sequence are determined, in the case of which the light source is active (e.g. all bits with the value "1" or "0"). The duty factor threshold value can, for example, be selected such that it specifies that the light source was active for no more than 8 bit periods (e.g. 80 ns).

In the case of some exemplary embodiments, the monitoring circuit comprises a window monitor, which is configured to monitor whether the light source is activated outside of the pulse sequence. For example, a malfunction of the light source can be determined thereby if, e.g., the light source is not deactivated after the pulse sequence or no longer correctly reacts to it.

In the case of some exemplary embodiments, the device comprises a pulse sequence generator, which is configured to generate the pulse signal sequence, e.g. based on the pulse signal.

The device can also further comprise a pulse window generator, which, based on the pulse signal, generates a pulse window, wherein, for example when receiving the pulse signal, the start of the pulse window is generated, and the end of the pulse window is generated at the end of the pulse train. The pulse window itself can be represented, for example, by a corresponding signal and represents the active time of the light source (based on a pulse train).

In the case of some exemplary embodiments, the monitoring circuit comprises a first transducer for the time-correlated scanning of the current signal from the light source (and for outputting a corresponding scanned and digitized current signal).

Quick time-to-digital transducers are well known and can have, for example, a time resolution of better than 500 picoseconds.

The current signal can thereby be digitized by the light source in a cost-efficient manner and with high time resolution.

In the case of some exemplary embodiments, the monitoring circuit comprises a second transducer for the time-correlated scanning of the voltage signal from the light source (and for outputting a corresponding scanned and digitized voltage signal).

The analog waveform of the current signal or of the voltage signal, respectively, can be scanned sequentially thereby, because it is synchronous and periodic to the TCSPC measuring cycle in the case of some exemplary embodiments.

In the case of some exemplary embodiments, the monitoring circuit comprises an energy calculator, which is configured to calculate an electrical energy value and, based thereon, a total light output or pulse energy, based on the current signal and/or voltage signal of the light source (e.g. based on the current or voltage signal, respectively, which were scanned by the first or second transducer, respectively). The energy calculator can, for example, easily calculate the energy by means of the multiplication of the voltage value U by the current value I, wherein the current value I is determined by integration of the current signal originating from the first transducer, and wherein the voltage value U can either be a model-based value (for example determined based on a linear connection with the current value I or determined based on a monotonously increasing function, which represents an unambiguous function for the connection between voltage value U and current value I), can be a specified constant, or can be determined by integration of the voltage signal originating from the second transducer.

In the case of some exemplary embodiments, the device further comprises a temperature compensator, which is configured to correct the emitted light output based on the electrical energy value and an operating temperature value of the light source. The emitted light output can generally correlate with the temperature, wherein, for example, the efficiency decreases with the increase of the temperature, so that a higher current, which flows through the light source, is not necessarily accompanied by a higher emitted optical energy. In other words, the required electrical energy can increase in correlation with the temperature increase, which is required for the same emitted light energy. The temperature compensator can take this effect into account, in that it corrects, for example, a light output, which takes place on the basis of the current and/or voltage signal, according to the current temperature, or in that it corrects a reference value, to which, for example, the electrical energy determined by the energy calculator is compared.

In the case of some exemplary embodiments, the light source therefore comprises a temperature sensor, which outputs the operating temperature value of the light source to the temperature compensator.

In the case of some exemplary embodiments, the device comprises a measuring resistor (e.g. shunt resistor), which outputs a voltage scanning signal based on a current signal of the light source. A differential amplifier can further be provided, which amplifies the voltage scanning signal of the measuring resistor. Moreover, the device can comprise a comparator, which compares the voltage scanning signal to a reference value, and based thereon, outputs a status signal of the light source to the monitoring circuit. The status signal can, for example, be a "light source on" signal, which signals that the light source is active.

In the case of some exemplary embodiments, the monitoring circuit comprises an error logic, which is configured to deactivate the light source, based on the monitoring of the light output emitted by the light source.

The device discussed herein can be integrated in a time-of-flight measuring device, such as, e.g., a LIDAR measuring device, which, in turn, can be integrated or provided in a motor vehicle or another device. The described device can also be used in an autonomously operated (motor) vehicle.

The method steps described above or herein, respectively, can also be the object of a method for operating a light source for the time-of-flight measurement (or for operating a LIDAR measuring device, respectively, or the like), which is carried out, for example, by a device described herein.

Some exemplary embodiments also relate to a (computer) program, which receives instructions, which, when they are run on a processor or computer, result in that the method described herein is carried out.

Some exemplary embodiments also relate to a computer-readable medium, which receives a program or instructions, respectively, which, when run on a processor or computer, result in that the program or method described herein, respectively, is carried out.

In summary, a monitoring of critical parameters of the eye safety is therefore provided in the case of some exemplary embodiments. The light source can be switched off by means of a corresponding signal, when a violation of a parameter, which is relevant for the eye safety, is detected. A start pulse signal can further be used to monitor the on-time of the light source (e.g. of the laser). In the case of some exemplary embodiments, the light source is switched off when a switch-on time ("t_on_max" of, e.g., seven or five nanosecond pulses) is exceeded. The light source can also be switched off when it is active outside of the pulse window and/or when a pulse sequence exceeds a duty factor threshold value. In the case of some exemplary embodiments, the average and the peak current value of the light source is also monitored, for example on the basis of a TDC circuit by using a histogram, wherein current values are filled into a histogram, in order to obtain a corresponding time-based current value course.

Figure 2:
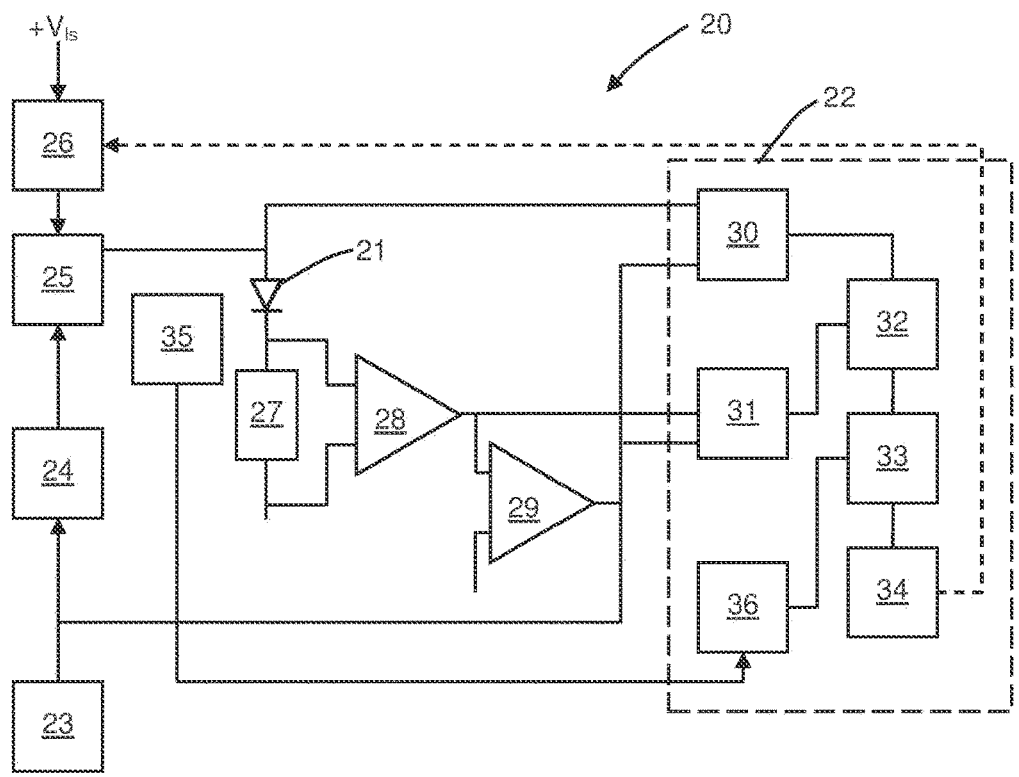

Exemplary embodiments of the invention will now be described in an exemplary manner and with reference to the enclosed drawing, in which:

FIG. 1 illustrates a first exemplary embodiment of a device for operating a light source for the optical time-of-flight measurement; and FIG. 2 illustrates a second exemplary embodiment of a device for operating a light source for the optical time-of-flight measurement.

FIG. 1 illustrates a circuit diagram of a first exemplary embodiment of a device 1 for operating a laser diode 2 for the optical time-of-flight measurement comprising a monitoring circuit 3 for monitoring the eye safety of the operation of the laser diode 2.

A start pulse generator 4 of the device 1 outputs periodic trigger signals in order to start a LIDAR pulse measurement, e.g. an individual measurement within a TCSPC cycle.

The periodic trigger signals or pulse signals are received by a pulse sequence generator 5, which, in reaction thereto, generates a pulse sequence, in that it transforms the periodic pulse signals into the pulse sequence, which can be, for example, a 16 bit sequence of "0" and "1", wherein a "1" causes a switch-on or activation of the laser (laser diode) 2, so that the laser 2 emits light pulses according to the pulse sequence. The pulse sequence is serialized with a 10 ns bit period. In the present exemplary embodiment, the length of a pulse train of light signals is 160 ns.

The pulse train can generally have any combination of "1" and "0" with a certain boundary condition for the "1", because the latter determines the on-time of the laser 2, so that the total number of "1", together with the pulse frequency, defines the average laser output. In the case of other exemplary embodiments, the pulse train can also have only a single light pulse.

The pulse sequence generator 5 outputs the pulse sequence to a laser driver 6, which converts the pulse sequence into high-current signals for operating the laser diode 2.

The laser driver 6 is connected to a laser switch 7, to which a laser supply voltage $+V_{ls}$ is applied, which, when the laser switch 7 is switched on, is supplied to the laser driver 6.

The laser switch 7 can switch off the laser diode 2, when for example the laser driver 6 has a malfunction, is defective, or when a short-circuit situation arises, which allows the laser diode 2 to permanently emit light (pulses), which would be critical with regard to the eye safety, and it moreover represents a redundant control path, because, in addition to the laser driver 6, the laser switch 7 can also switch off the laser diode. The laser switch 7 can moreover receive a corresponding switch-off signal from the monitoring circuit 3, as will also be described in more detail below.

The current, which flows through the laser diode 2, is measured by the voltage drop via a shunt resistor 8, which is connected to the laser diode 2. The scanned voltage is supplied to a differential amplifier 9, which amplifies the small scanning voltage signal and outputs it to a comparator 10.

The comparator 10 compares the amplified voltage scanning signal to a reference value and outputs a corresponding laser status signal, which indicates, whether the laser diode is on (voltage scanning signal greater than the reference value) or is off (voltage scanning signal smaller than the reference value).

In the present exemplary embodiment, the signal, which is output by the comparator 10, is a laser-on signal, and the first rising edge of this signal can be used to start the TDCs for the time-of-flight measurement.

The start pulse generator 4 also supplies the pulse signal to a pulse window generator 11, so that the start pulse generator 4 triggers the pulse window generator 11. The pulse window generator outputs a window signal, which is set "high" (start of the window), as soon as the start pulse was received, and which is set to "low" (end of the window) after the maximum time of the pulse train, that is, e.g., after 160 ns, which corresponds to the length of the pulse train in this exemplary embodiment.

The laser-on signal of the comparator 10 is supplied to the monitoring circuit 3, which has three monitors, namely an on-time monitor 12, a duty factor monitor 13, and a window monitor 14.

The on-time monitor 12 checks whether the continuous switch-on time of the laser diode 2 (without interruption) exceeds a predefined switch-on time threshold value. For example, the laser diode 2 must not be activated longer than for two consecutive pulses, i.e. two consecutive "1" of the pulse sequence here. The on-time monitor 12 therefore outputs an error signal to an error logic 15, when the switch-on time or activation time in this exemplary embodiment lies above a switch-on time threshold value of 22 ns, wherein the 22 ns results from the switch-on time of 20 ns for two pulses with an added tolerance of 2 ns.

The duty factor monitor 13 accumulates or integrates the on-times of the laser diode 2 within a period, which is defined by the pulse train window, supplied by the pulse window generator 11. In this exemplary embodiments, the duty factor monitor 13 outputs an error to the error logic 15, when the laser diode 2 is activated for more than 8 bit periods (=80 ns=duty factor threshold value) within a pulse sequence (without limiting the present invention to this specific example).

The window monitor 14 checks that the laser diode 2 is not operated or activated, respectively, outside of the pulse sequence window (window signal), which is supplied by the pulse window generator 11. A malfunction of the system can be detected thereby when, for example, the laser driver 6 has a malfunction, is defective, or the like, and, for example, does not switch off at the end of a pulse sequence. The window monitor 14 likewise outputs an error signal to the error logic 15 in this case.

The error logic 15 combines the error signals, which it receives from the monitors 12 to 14, and, in the case of an error, it sends a corresponding switch-off signal to the laser switch 7, which switches off the laser diode 2 in reaction to the switch-off signal. The error logic 15 can moreover also send a corresponding error report to a primary control.

FIG. 2 illustrates a circuit diagram of a second exemplary embodiment of a device 20 for operating a laser diode 21 for the optical time-of-flight measurement comprising a monitoring circuit 22 for monitoring the eye safety of the operation of the laser diode 21.

This exemplary embodiment refers to the TCSP LIDAR measuring principle and at least two pulses or pulse sequences are emitted one after the other without change.

A start pulse generator 23 of the device 20 periodically outputs trigger signals, in order to start a LIDAR pulse measurement, e.g. an individual measurement within a TCSPC cycle.

The periodic trigger signals or pulse signals are received by a pulse sequence generator 24, which, in reaction thereto, generates a pulse sequence, in that it transforms the periodic pulse signals into the pulse sequence, which can be, for example, a 16 bit sequence of "0" and "1", wherein "1" causes a switch-on or activation of the laser (laser diode) 21, so that the laser 21 emits light pulses according to the pulse sequence. The pulse sequence is serialized with a 10 ns bit period. In the present exemplary embodiment, the length of a pulse train of light signals is 160 ns.

The pulse train can generally have any combination of "1" and "0" with a certain boundary condition for the "1", because the latter determines the on-time of the laser 21, so that the total number of "1", together with the pulse frequency, define the average laser output.

The pulse sequence generator 24 outputs the pulse sequence to a laser driver 6, which converts the pulse sequence into high signals (current signals) for operating the laser diode 21.

The laser driver 25 is connected to a laser switch 26, to which a laser supply voltage $+V_{ls}$ is applied, which, when the laser switch 26 is switched on, is supplied to the laser driver 25.

The laser switch 26 can switch off the laser diode 21, when, for example, the laser driver 25 has a malfunction, is defective, or when a short-circuit situation arises, which allows the laser diode 21 to permanently emit light (pulses), which would be critical with regard to the eye safety, and it moreover represents a redundant control path, because, in addition to the laser driver 25, the laser switch 26 can also switch off the laser diode 21. The laser switch 26 can moreover receive a corresponding switch-off signal from the monitoring circuit 22, as will also be described in more detail below.

The current, which flows through the laser diode 21, is measured by the voltage drop via a shunt resistor 27, which is connected to the laser diode 21. The scanned voltage is supplied to a differential amplifier 28, which amplifies the small scanning voltage signal and outputs it to a comparator 29.

The comparator 29 compares the amplified voltage scanning signal to a reference value and outputs a corresponding laser status signal, which indicates, whether the laser diode 21 is on (voltage scanning signal greater than the reference value) or is off (voltage scanning signal smaller than the reference value).

In the present exemplary embodiment, the signal, which is output by the comparator 29, is a laser-on signal, and the first rising edge of this signal can be used to start the TDCs for the time-of-flight measurement and also to start the two TCADCs 30 and 31 (see also further below) of the monitoring circuit 22. In the alternative, the start pulse of the start pulse generator 23 can also be used for this purpose, wherein the output signal of the comparator 29 is slightly delayed and is not influenced by the laser driver 25 by means of jittering. The TCADCs 30 and 31 can be designed, for example, in the manner as it is disclosed in the German patent application No. 102018220688.0, the content of which is incorporated completely herein by reference.

In the represent exemplary embodiment, the monitoring circuit has a first TCADC 30 (time correlated analog-to-digital converter), also referred to as first transducer 30, and a second TCADC 31, also referred to as second transducer 31.

The first TCADC 30 scans the analog current signal, which is supplied by the differential amplifier 28, in a time-correlated manner, and provides a scanned current signal, which is supplied to an energy calculator 32, for the further processing after a TCSPC cycle, e.g. one hundred pulse repetitions.

In the present exemplary embodiment (can be omitted in the case of others), the second TCADC 31 scans the analog voltage signal of the "high side" of the laser diode 21 in a time-correlated manner, and the second TCADC 31 provides a scanned voltage signal, which is likewise supplied to the energy calculator 32, for the further processing, after a TCSPC cycle or, e.g., one hundred pulse repetitions.

As soon as available (e.g. after one hundred pulse repetitions), the energy calculator 32 calculates the total pulse energy (total electrical energy, which has flown through the laser diode 21 and which corresponds to an emitted light output), based on the digitized current signal from the first TCADC 30 and the digitized voltage signal of the second TCADC 31, by multiplying the integral over the voltage signal by the integral over the current signal.

In the case of exemplary embodiments, in which the second TCADC 31 is not provided, the voltage value can be assumed as constant or can be derived, for example, via a linear (or monotonous, as specified above) context with the current signal.

The value of the total pulse energy (here therefore the total electrical energy) is supplied to a comparator 33, which compares the value of the total pulse energy to a reference value, and when the reference value is exceeded, outputs a corresponding error signal to an error logic 34, wherein, in reaction to the error signal, the error logic 34 outputs a corresponding switch-off signal to the laser switch 26, which then shuts off the laser diode 21. The error logic 34 can thereby also receive other error signals.

In the present exemplary embodiment, a temperature sensor 35 is provided at the laser diode 21, which determines the operating temperature of the laser diode 21 and which supplies a corresponding temperature signal to a temperature compensator 36 of the monitoring circuit 22.

The temperature compensator 36 monitors the temperature of the laser diode 21 based on the received temperature signal. The measured electrical energy (by the scanning of the TCADCS 30 and 31 and calculated by the energy calculator 32), which is consumed by the laser diode 21, is linked to the emitted light output via the optical efficiency of the laser diode 21, wherein the efficiency or the degree of efficiency of the laser diode 21 is temperature-dependent, so that the efficiency decreases with increasing temperature, in particular at a temperature of above 60° C. in the case of this exemplary embodiment.

However, the emitted light energy or light output, respectively, is not relevant for the eye safety, so that the electrical energy can also be increased in response to high operating temperatures of the laser diode 21, without the emitted light output being too high with respect to the eye safety.

In its storage, the temperature compensator 36 has stored a connection between the emitted optical light output and the operating temperature, and can therefore adapt the reference value stored there based on the current operating temperature by communication with the comparator 33, so that the reference value for the permissible pulse energy (which is based on the electrical energy, as was specified above) is increased accordingly in response to higher operating temperatures.

The invention claimed is:

1. A device for operating a light source for an optical time-of-flight measurement, comprising:
   a light source, which is configured to emit light pulses according to a pulse signal sequence; and
   a monitoring circuit for monitoring a light output emitted by the light source based on a current signal and/or a voltage signal of the light source, wherein the monitoring circuit is configured to deactivate or not to activate the light source when the emitted light output exceeds a threshold value, wherein the monitoring circuit comprises first transducer for a first time-correlated scanning of the current signal from the light source, and a second transducer for a second time-correlated scanning of the voltage signal from the light source.

2. The device according to claim 1, wherein the monitoring circuit comprises an on-time monitor, which is configured to monitor whether a continuous switch-on time of the light source is less than a specified switch-on time threshold value.

3. The device according to claim 1, wherein the monitoring circuit comprises a duty factor monitor, which is configured to monitor whether a duty factor of the light pulses is smaller than a specified duty factor threshold value.

4. The device according to claim 1, wherein the monitoring circuit comprises a window monitor, which is configured to monitor whether the light source is activated outside of the pulse signal sequence.

5. The device according to claim 1, further comprising a pulse sequence generator, which is configured to generate the pulse signal sequence.

6. The device according to claim 5, further comprising a pulse window generator, which generates a pulse window based on a pulse signal.

7. The device according to claim 1, wherein the monitoring circuit comprises an energy calculator, which is configured to calculate an electrical energy value based on the current signal and/or the voltage signal of the light source.

8. The device according to claim 7, further comprising a temperature compensator which is configured to correct the emitted light output based on the electrical energy value and an operating temperature value of the light source.

9. The device according to claim 8, wherein the light source comprises a temperature sensor, which outputs the operating temperature value of the light source to the temperature compensator.

10. The device according to claim 1, further comprising a measuring resistor, which outputs a voltage scanning signal based on the current signal of the light source.

11. The device according to claim 10, further comprising a differential amplifier, which amplifies the voltage scanning signal for the measuring resistor.

12. The device according to claim 11, further comprising a comparator, which compares the voltage scanning signal to a reference value and based thereon, outputs a status signal of the light source to the monitoring circuit.

13. The device according to claim 1, wherein the monitoring circuit comprises an error logic, which is configured to deactivate the light source, based on the monitoring of the light output emitted by the light source.

14. A light detecting and ranging (LIDAR) device, comprising:
    a light source to emit light pulses according to a pulse signal sequence;
    a monitoring circuit for monitoring a light output emitted by the light source based on a current signal and a voltage signal of the light source;
    an energy calculation circuit do determine an emitted light energy based on the current signal and the voltage signal; and
    a pulse sequence generator to modify the pulse signal sequence responsive to the emitted light energy.

15. The LIDAR device of claim 14, further comprising an on-time monitor to determine whether a continuous switch-on time of the light source exceeds a predefined switch-on time threshold value.

16. The LIDAR device of claim 14, further comprising a duty factor monitor to integrate on-times of the light source to generate an error signal when a duty cycle of the light pulses exceeds a threshold value.

17. The LIDAR device of claim 14, wherein the pulse sequence generator is configured to modify the pulse signal sequence when the emitted light energy exceeds an eye safety threshold.

18. A method comprising:
    generating a pulse signal sequence, wherein the pulse signal sequence includes a first set of pulse periods in which a light source is to be activated and a second set of pulse periods in which the light source is not to be activated;
    activating the light source according to the pulse signal sequence;
    measuring a time-of-flight of pulses emitted by the light source to determine a distance to an object;
    measuring a current signal of the light source;
    measuring a voltage signal of the light source;
    determining an emitted light energy from the current signal and the voltage signal;
    determining that the emitted light energy exceeds a threshold; and
    modifying the pulse signal sequence to reduce the emitted light energy.

19. The method of claim 18, wherein the modifying the pulse signal sequence comprises decreasing a number of the first set of pulse periods.

20. The method of claim 18, wherein the modifying the pulse signal sequence comprises increasing a number of the second set of pulse periods.

* * * * *